(12) United States Patent
Akimoto et al.

(10) Patent No.: US 7,665,558 B2
(45) Date of Patent: Feb. 23, 2010

(54) ENGINE MISFIRE DETECTION APPARATUS, HYBRID VEHICLE EQUIPPED WITH THE SAME, AND ENGINE MISFIRE DETECTION METHOD

(75) Inventors: Hikokazu Akimoto, Aichi-gun (JP); Osamu Harada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/919,924

(22) PCT Filed: Feb. 14, 2007

(86) PCT No.: PCT/JP2007/052603

§ 371 (c)(1),
(2), (4) Date: Nov. 6, 2007

(87) PCT Pub. No.: WO2007/094355

PCT Pub. Date: Aug. 23, 2007

(65) Prior Publication Data

US 2009/0065275 A1    Mar. 12, 2009

(30) Foreign Application Priority Data

Feb. 15, 2006    (JP) ............................. 2006-038376

(51) Int. Cl.
*B60W 10/06*    (2006.01)

(52) U.S. Cl. ............................... 180/65.28; 123/406.27
(58) Field of Classification Search ............ 180/65.265, 180/65.21, 65.27, 65.28; 701/102, 111; 123/406.14, 123/479; 73/114.08, 114.67, 114.38
See application file for complete search history.

(56) References Cited

U.S. PATENT DOCUMENTS 5,337,716 A * 8/1994 Fukui et al. ............ 123/406.14
5,497,751 A * 3/1996 Ohtake ........................ 123/479
5,574,217 A * 11/1996 McCombie ............... 73/114.04

(Continued)

FOREIGN PATENT DOCUMENTS

JP    A 2000-120486    4/2000

(Continued)

*Primary Examiner*—Hau V Phan
(74) *Attorney, Agent, or Firm*—Oliff & Berridge, PLC

(57) ABSTRACT

Engine misfire is detected by using threshold values that vary depending on whether damping control is executed. First threshold values are adopted at the setting of a gearshift position to a drive position or a park position where damping control is performed to reduce the vibration of an engine. Second threshold values are adopted at the setting of the gearshift position to a neutral position where the damping control is not performed, the second threshold values being greater than the first threshold values. Engine misfire detection is carried out by processing using the first and second threshold values.

7 Claims, 6 Drawing Sheets

U.S. PATENT DOCUMENTS

| | | | |
|---|---|---|---|
| 5,804,711 A * | 9/1998 | Remboski et al. | 73/114.05 |
| 5,841,025 A * | 11/1998 | Remboski et al. | 73/114.05 |
| 5,862,507 A * | 1/1999 | Wu et al. | 701/111 |
| 6,112,149 A * | 8/2000 | Varady et al. | 701/111 |
| 6,243,641 B1 * | 6/2001 | Andrews et al. | 701/102 |
| 6,336,439 B1 * | 1/2002 | Frohn et al. | 123/479 |
| 6,591,666 B1 * | 7/2003 | Kacewicz et al. | 73/114.04 |
| 6,768,308 B2 * | 7/2004 | Hanazaki et al. | 73/114.08 |
| 6,885,962 B2 * | 4/2005 | Yamashita | 702/120 |
| 7,006,912 B2 * | 2/2006 | He et al. | 701/111 |
| 7,155,965 B2 * | 1/2007 | Kim | 73/114.03 |
| 7,293,453 B2 * | 11/2007 | Aono et al. | 73/114.38 |

FOREIGN PATENT DOCUMENTS

| | | |
|---|---|---|
| JP | A 2000-240501 | 9/2000 |
| JP | A 2001-065402 | 3/2001 |
| JP | A 2001-317402 | 11/2001 |
| JP | A 2004-084607 | 3/2004 |
| JP | A 2005-351134 | 12/2005 |

* cited by examiner

ENGINE MISFIRE DETECTION APPARATUS, HYBRID VEHICLE EQUIPPED WITH THE SAME, AND ENGINE MISFIRE DETECTION METHOD

TECHNICAL FIELD

The present invention relates to an engine misfire detection apparatus, a hybrid vehicle equipped with the engine misfire detection apparatus, and an engine misfire detection method.

BACKGROUND ART

One proposed engine misfire detection apparatus for an internal combustion engine is mounted on a hybrid vehicle that is driven with output powers from the engine and a motor generator linked with a crankshaft of the engine (see, for example, Patent Document 1). This prior art engine misfire detection apparatus detects an engine misfire based on a torque correction value during execution of damping control with the motor generator, which corrects a torque command value with the torque correction value for canceling out a torque variation of the engine. The prior art engine misfire detection apparatus detects an engine misfire based on a variation in rotation of the engine during non-execution of the damping control with the motor generator. This arrangement is expected to detect an engine misfire with sufficient accuracy even during execution of the damping control with the motor generator to reduce the variation in rotation of the engine.

Patent Document 1: Japanese Patent Laid-Open Gazette No. 2001-65402

DISCLOSURE OF THE INVENTION

The engine misfire detection apparatus disclosed in the cited Patent Document 1 changes over the engine misfire detection method according to execution or non-execution of the damping control with the motor generator, between the engine misfire detection based on the torque correction value of the motor generator and the engine misfire detection based on the variation in rotation of the engine, which requires input of a different variable from the torque correction value. The engine misfire detection methods respectively require the input of specified measurement or detection values and the computation of the input values. This causes a complicated series of processing for the engine misfire detection.

In order to solve this problem of the prior art, the present invention provides a technique that is actualized by an engine misfire detection apparatus, a hybrid vehicle equipped with the engine misfire detection apparatus, or a corresponding engine misfire detection method. There is a need of enabling detection of a misfire in an internal combustion engine without any complicated processing in a power output apparatus that performs damping control with at least one of a power generation unit and a motor to reduce the vibration of the internal combustion engine.

At least part of the above and the other related demands is attained by an engine misfire detection apparatus of the invention having the configuration discussed below.

According to one aspect, the present invention is directed to an engine misfire detection apparatus for detection of a misfire in an internal combustion engine included in a power output apparatus, where the power output apparatus includes the internal combustion engine, a power generation unit that is connected with an output shaft of the internal combustion engine and utilizes at least part of output power from the internal combustion engine to generate electric power, and a motor that is capable of outputting power to a driveshaft.

The engine misfire detection apparatus includes:

a rotational position detection unit that detects a rotational position of the output shaft of the internal combustion engine;

a unit angle rotation time computation module that computes a unit angle rotation time, which is required for rotation of every preset unit rotational angle of the output shaft of the internal combustion engine, from the detected rotational position;

a damping control execution module that performs damping control upon satisfaction of a predetermined condition, where the damping control drives at least one of the power generation unit and the motor to reduce vibration of the internal combustion engine caused by operation of the internal combustion engine; and an engine misfire detection module that detects an engine misfire based on the computed unit angle rotation time and a preset first threshold value during execution of the damping control by the damping control execution module, while detecting an engine misfire based on the computed unit angle rotation time and a preset second threshold value that is different from the first threshold value during non-execution of the damping control by the damping control execution module.

The engine misfire detection apparatus of the invention detects an engine misfire based on the preset first threshold value and the unit angle rotation time, which is required for rotation of every preset unit rotational angle of the output shaft of the internal combustion engine and is computed from the detected rotational position, during execution of the damping control that drives at least one of the power generation unit and the motor to reduce the vibration of the internal combustion engine caused by operation of the internal combustion engine. The engine misfire detection apparatus detects an engine misfire based on the computed unit angle rotation time and the preset second threshold value that is different from the preset first threshold value during non-execution of the damping control. The threshold values used for engine misfire detection are changed over according to the execution or non-execution of the damping control. This arrangement enables engine misfire detection by a simple series of processing, compared with the conventional engine misfire detection apparatus of changing the engine misfire detection method according to the execution or non-execution of the damping control.

In one aspect of the engine misfire detection apparatus of the invention, the damping control execution module determines satisfaction of the predetermined condition in response to selection of either a parking position or a drive position as a gearshift position to perform the damping control. The damping control execution module determines dissatisfaction of the predetermined condition in response to selection of a neutral position as the gearshift position not to perform the damping control. In general, neither the power generation unit nor the motor is driven and controlled at the neutral position. This arrangement thus utilizes the setting of the gearshift position to readily identify execution or non-execution of the damping control.

In one preferable embodiment of the engine misfire detection apparatus of the invention, the engine misfire detection module detects an engine misfire when a rotation speed of the driveshaft is equal to 0.

In one preferable embodiment of the engine misfire detection apparatus of the invention, the engine misfire detection module uses the second threshold value, which is greater than the first threshold value, for detection of an engine misfire during non-execution of the damping control by the damping control execution module. This arrangement ensures accurate detection of a misfire in the internal combustion engine.

In another preferable embodiment of the engine misfire detection apparatus of the invention, the engine misfire detection module detects a misfire of the internal combustion engine in response to a predetermined angle difference of the computed unit angle rotation time exceeding the preset first threshold value during execution of the damping control by the damping control execution module. The engine misfire detection module detects a misfire of the internal combustion engine in response to the predetermined angle difference of the computed unit angle rotation time exceeding the preset second threshold value during non-execution of the damping control by the damping control execution module. The terminology of the 'predetermined angle difference of the unit angle rotation time' in the specification hereof represents a difference between a currently input unit angle rotation time and a previous unit angle rotation time input a predetermined angle before. The 'predetermined angle difference of the unit angle rotation time exceeding the first threshold value or exceeding the second threshold value' may be replaced by the absolute value of the predetermined angle difference of the unit angle rotation time exceeding the first threshold value or exceeding the second threshold value. The engine misfire detection module may use at least one of a 720-degree difference, a 360-degree difference, and a 120-degree difference of the computed unit angle rotation time as the predetermined angle difference for detection of an engine misfire. It is preferable to use at least two of the 720-degree difference, the 360-degree difference, and the 120-degree difference of the computed unit angle rotation time as the predetermined angle difference for the enhanced accuracy of detection of a misfire in the internal combustion engine.

The present invention is also directed to a hybrid vehicle equipped with a power output apparatus and with an engine misfire detection apparatus for detection of a misfire in the internal combustion engine having any of the arrangements described above. The power output apparatus includes the internal combustion engine, a power generation unit that is connected with an output shaft of the internal combustion engine and utilizes at least part of output power from the internal combustion engine to generate electric power, and a motor that is capable of outputting power to a driveshaft. As described above, the engine misfire detection apparatus enables detection of a misfire in the internal combustion engine without any complicated processing in the power output apparatus that performs the damping control with at least one of the power generation unit and the motor to reduce the vibration of the internal combustion engine. The hybrid vehicle equipped with such an engine misfire detection apparatus exerts the same effects.

According to another aspect, the present invention is directed to an engine misfire detection method for detection of a misfire in an internal combustion engine included in a power output apparatus, where the power output apparatus includes the internal combustion engine, a power generation unit that is connected with an output shaft of the internal combustion engine and utilizes at least part of output power from the internal combustion engine to generate electric power, and a motor that is capable of outputting power to a driveshaft.

The engine misfire detection method includes:

detecting a rotational position of the output shaft of the internal combustion engine;

computing a unit angle rotation time, which is required for rotation of every preset unit rotational angle of the output shaft of the internal combustion engine, from the detected rotational position; and detecting an engine misfire based on the computed unit angle rotation time and a preset first threshold value during execution of damping control, which is performed upon satisfaction of a predetermined condition and drives at least one of the power generation unit and the motor to reduce vibration of the internal combustion engine caused by operation of the internal combustion engine, while detecting an engine misfire based on the computed unit angle rotation time and a preset second threshold value that is different from the preset first threshold value during non-execution of the damping control.

The engine misfire detection method of the invention detects an engine misfire based on the preset first threshold value and the unit angle rotation time, which is required for rotation of every preset unit rotational angle of the output shaft of the internal combustion engine and is computed from the detected rotational position, during execution of the damping control that drives at least one of the power generation unit and the motor to reduce the vibration of the internal combustion engine caused by operation of the internal combustion engine. The engine misfire detection method detects an engine misfire based on the computed unit angle rotation time and the preset second threshold value that is different from the preset first threshold value during non-execution of the damping control. The threshold values used for engine misfire detection are changed over according to the execution or non-execution of the damping control. This arrangement enables engine misfire detection by a simple series of processing, compared with the conventional procedure of changing the engine misfire detection method according to the execution or non-execution of the damping control. The engine misfire detection method of the invention may adopt any of the various arrangements of the engine misfire detection apparatus described above or may include any additional step for actualizing any of the various functions of the engine misfire detection apparatus described above.

BEST MODES OF CARRYING OUT THE INVENTION

One mode of carrying out the invention is described below as a preferred embodiment with reference to the accompanied drawings.

Figure 1:
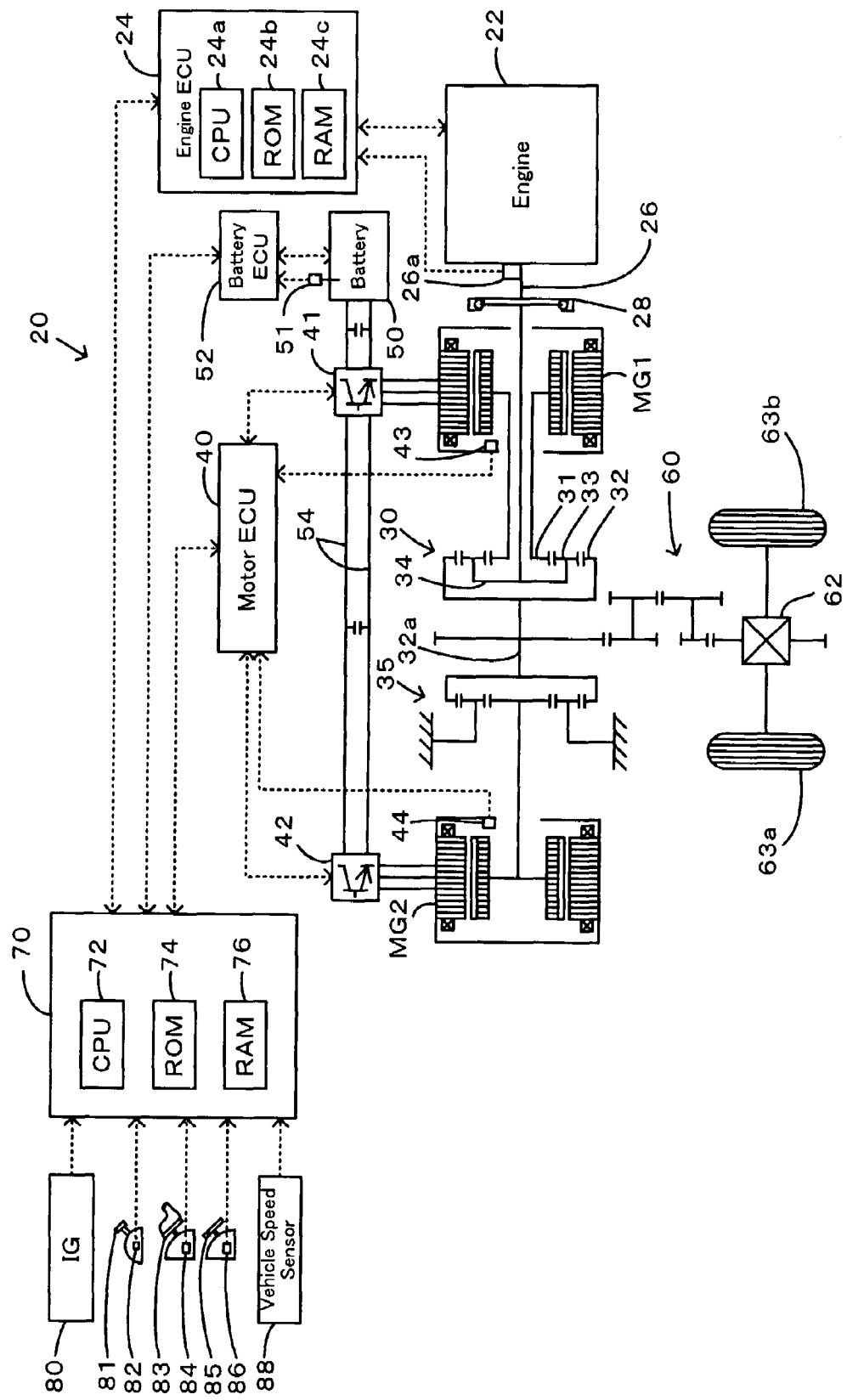
FIG. 1 schematically illustrates the configuration of a hybrid vehicle 20 in one embodiment of the invention.

FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a reduction gear 35 that is attached to a ring gear shaft 32a or a driveshaft connected to the power distribution integration mechanism 30, a motor MG2 that is linked with the reduction gear 35, and a hybrid electronic control unit 70 that controls the operations of the whole power output apparatus.

The engine 22 is a six-cylinder internal combustion engine that consumes a hydrocarbon fuel, such as gasoline or light oil, to output power. An engine electronic control unit (hereafter referred to as engine ECU) 24 inputs signals representing the operating conditions of the engine 22 from various sensors and performs operation control of the engine 22 including fuel injection control, ignition control, and intake air flow regulation. The engine ECU 24 is constructed as a microprocessor including a CPU 24a, a ROM 24b that stores processing programs, a RAM 24c that temporarily stores data, input and output ports (not shown), and a communication port (not shown). The engine ECU 24 inputs signals from various sensors that measure and detect the operating conditions of the engine 22, for example, a crank position from a crank position sensor 26a detected as the rotational position of the crankshaft 26. The engine ECU 24 communicates with the hybrid electronic control unit 70. The engine ECU 24 controls the operations of the engine 22 in response to control signals input from the hybrid electronic control unit 70, while outputting data regarding the operating conditions of the engine 22 to the hybrid electronic control unit 70 according to the requirements. The engine misfire detection apparatus for the internal combustion engine is mainly attained by the engine ECU 24 in this embodiment.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed to the sun gear 31 and to the ring gear 32 according to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 60 and a differential gear 62 and is eventually output to drive wheels 63a and 63b of the hybrid vehicle 20.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. The operations of both the motors MG1 and MG2 are controlled by a motor electronic control unit (hereafter referred to as motor ECU) 40. The motor ECU 40 inputs signals required for controlling the operations of the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to control the operations of the motors MG1 and MG2 in response to control signals input from the hybrid electronic control unit 70 and to output data regarding the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current measured by the current sensor, for the purpose of management and control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

The hybrid vehicle 20 of the embodiment constructed as described above sets a torque demand to be output to the ring gear shaft 32a or the driveshaft, based on the vehicle speed V and the accelerator opening Acc corresponding to the driver's depression amount of the accelerator pedal 83. The engine 22 and the motors MG1 and MG2 are controlled to be driven at efficient drive points, in order to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

In the hybrid vehicle 20 of the embodiment, the engine 22 and the motors MG1 and MG2 are controlled according to the power demand at the setting of the gearshift position SP to an ordinary drive (D) position for forward driving with torque output to the ring gear shaft 32a or the driveshaft, a reverse (R) position for reverse driving, or a parking (P) position for parking. During operation of the engine 22 at selection of any of the D position, the R position, and the P position, the hybrid vehicle 20 performs damping control of the engine 22. The damping control computes a torque correction value to cancel out a torque variation of the engine 22, corrects torque commands of the motors MG1 and MG2 with the computed torque correction value, and drives and controls the motors MG1 and MG2 to attain the corrected torque commands. At the setting of the gearshift position SP to a neutral (N) position, however, the hybrid electronic control unit 70 shuts down the inverters 41 and 42 to prevent output of unrequired torques from the motors MG1 and MG2 to the ring gear shaft 32a. Since the torque output from the motors MG1 and MG2 is prohibited at the N position, the hybrid vehicle 20 does not perform the damping control of the engine 22 even during operation of the engine 22.

Figure 2:
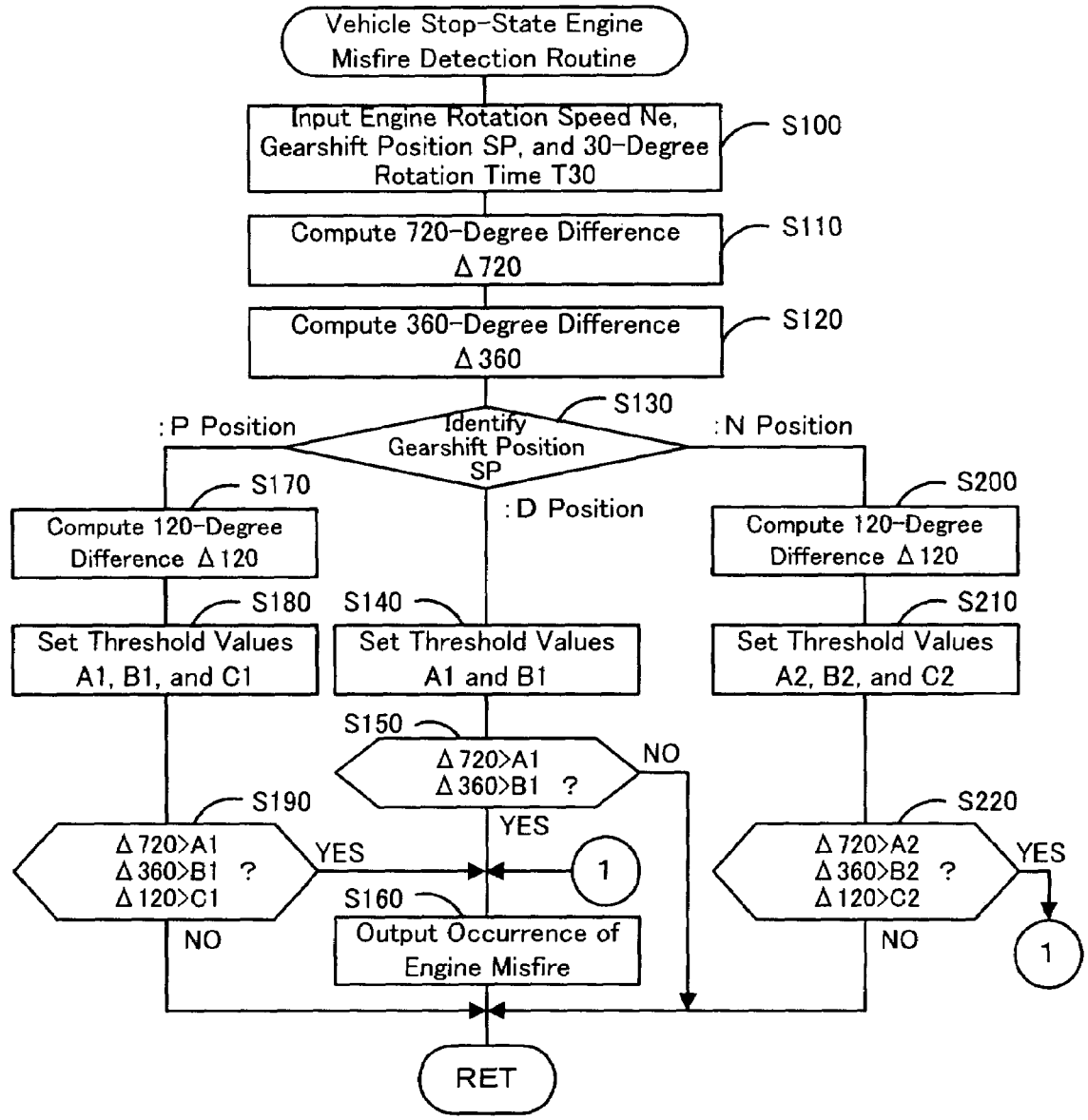
FIG. 2 is a flowchart showing an engine misfire detection routine executed in a vehicle stop state by an engine ECU 24.

The description regards a series of operations to detect a misfire in any of the cylinders of the engine 22 mounted on the hybrid vehicle 20 of the embodiment constructed as described above. FIG. 2 is a flowchart showing an engine misfire detection routine executed in a vehicle stop state by the engine ECU 24. This vehicle stop-state engine misfire detection routine is stored in the ROM 24b and is performed under the condition of the rotation speed of the ring gear shaft 32a equal to 0 or the vehicle speed V equal to 0 in a repeated manner at preset time intervals.

In the engine misfire detection routine, the CPU 24a of the engine ECU 24 first inputs an engine rotation speed Ne, a current setting of the gearshift position SP, and a 30-degree rotation time T30 computed as a time required for a 30-degree rotation of the crankshaft 26 (step S100). The rotation speed Ne of the engine 22 is computed from the signal output from the crank position sensor 26a attached to the crankshaft 26. The current setting of the gearshift position SP is input as the signal of the gearshift position sensor 82 from the hybrid electronic control unit 70 by communication. The 30-degree rotation time T30 is computed by a T30 computation routine (not shown). The T30 computation routine successively inputs the time of each 30-degree rotation of a crank angle CA detected by the crank position sensor 26a and calculates a difference between the currently input time for a current 30-degree rotation of the crank angle CA and the previously input time for a previous 30-degree rotation of the crank angle CA to compute the 30-degree rotation time T30.

The CPU 24a subsequently computes a 720-degree difference $\Delta 720$ of the input 30-degree rotation time T30 (step S110). The 720-degree difference $\Delta 720$ of the 30-degree rotation time T30 is given as a difference between the currently input 30-degree rotation time T30 and a previous 30-degree rotation time T30 input 720 degrees before. In the six-cylinder engine, explosive combustion of the air-fuel mixture takes place at the crank angle CA of every 120 degrees. The 720-degree difference $\Delta 720$ between a large 30-degree rotation time T30 for a misfired cylinder and a small 30-degree rotation time T30 for a non-misfired cylinder is greater than the 720-degree difference $\Delta 720$ between 30-degree rotation times T30 for two non-misfired cylinders. A peak of the 720-degree difference $\Delta 720$ thus substantially corresponds to a misfired cylinder (see FIG. 3 described later). The CPU 24a computes a 360-degree difference $\Delta 360$ of the 30-degree rotation time T30 (step S120) in the same manner as the computation of the 720-degree difference $\Delta 720$ of the 30-degree rotation time T30. The CPU 24a identifies the current setting of the gearshift position SP (step S130) and performs a subsequent series of engine misfire detection process (steps S140 to S220). The engine misfire detection process of this embodiment detects a single misfire pattern with only one misfired cylinder among the multiple cylinders of the engine 22

Figure 3:
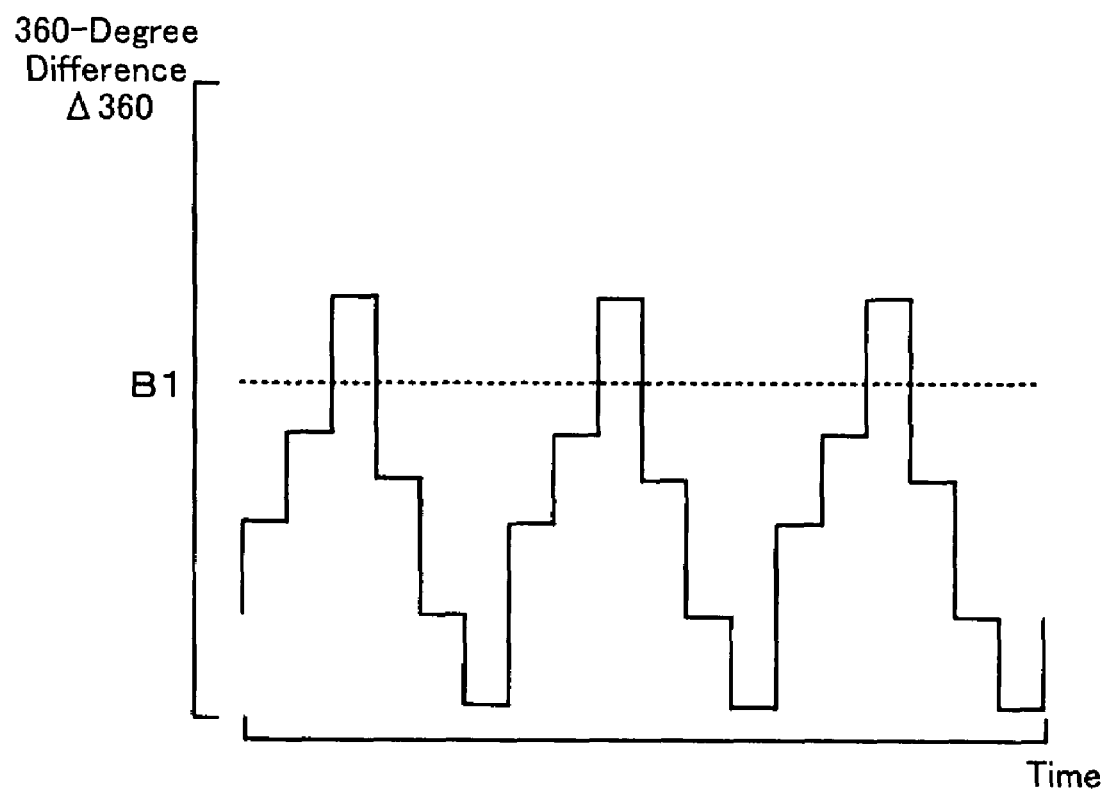
FIG. 3 is a chart showing a variation in 360-degree difference Δ360 in a single misfire state at a D position.

Upon identification of the drive (D) position as the current setting of the gearshift position SP at step S130, the CPU 24a sets threshold values A1 and B1 for engine misfire detection corresponding to the D position (step S140). The threshold value A1 is empirically or otherwise determined to detect the occurrence of a misfire in the engine 22 when the 720-degree difference $\Delta 720$ exceeds the threshold value A1. The threshold value B1 is empirically or otherwise determined to detect the occurrence of a misfire in the engine 22 when the 360-degree difference $\Delta 360$ exceeds the threshold value B1. After setting the threshold values A1 and B1, the CPU 24a determines whether the 720-degree difference $\Delta 720$ exceeds the threshold value A1 and whether the 360-degree difference $\Delta 360$ exceeds the threshold value B1 (step S150). Upon satisfaction of at least one of the conditions that the 720-degree difference $\Delta 720$ does not exceed the threshold value A1 and that the 360-degree difference $\Delta 360$ does not exceed the threshold value B1, the CPU 24a identifies a current target cylinder of misfire detection as no misfired cylinder and terminates the vehicle stop-state engine misfire detection routine. Upon satisfaction of both the conditions that the 720-degree difference $\Delta 720$ exceeds the threshold value A1 and that the 360-degree difference $\Delta 360$ exceeds the threshold value B1, on the other hand, the CPU 24a identifies the current target cylinder of misfire detection as a misfired cylinder and outputs the occurrence of a single misfire (step S160) before terminating the vehicle stop-state engine misfire detection routine. In the six-cylinder engine, explosive combustion of the air-fuel mixture takes place at the crank angle CA of every 120 degrees as mentioned above. The 360-degree difference $\Delta 360$ between a large 30-degree rotation time T30 for a misfired cylinder and a small 30-degree rotation time T30 for a non-misfired cylinder is greater than the 360-degree difference $\Delta 360$ between 30-degree rotation times T30 for two non-misfired cylinders. A peak of the 360-degree difference $\Delta 360$ thus also substantially corresponds to a misfired cylinder. FIG. 3 is a chart showing a variation in 360-degree difference $\Delta 360$ in a single misfire state at the D position as the current setting of the gearshift position SP. In the chart of FIG. 3, a cylinder having the 360-degree difference Δ360 exceeding the threshold value B1 is specified as a misfired cylinder. At the setting of the gearshift position SP to the D position where the damping control of the engine 22 is performed and the torque is output to the ring gear shaft 32a or the driveshaft, detection of an engine misfire is based on the 720-degree difference Δ720 and the 360-degree difference Δ360.

Upon identification of the parking (P) position as the current setting of the gearshift position SP at step S130, the CPU 24a computes a 120-degree difference Δ120 of the 30-degree rotation time T30 (step S170) in the same manner as the computation of the 720-degree difference Δ720 of the 30-degree rotation time T30. The CPU 24a then sets threshold values A1, B1, and C1 for engine misfire detection corresponding to the P position (step S180). The threshold values A1 and B1 are identical with those described above. The threshold value C1 is empirically or otherwise determined to detect the occurrence of a misfire in the engine 22 when the 120-degree difference Δ120 exceeds the threshold value C1. After setting the threshold values A1, B1, and C1, the CPU 24a determines whether the 720-degree difference Δ720 exceeds the threshold value A1, whether the 360-degree difference Δ360 exceeds the threshold value B1, and whether the 120-degree difference Δ120 exceeds the threshold value C1 (step S190). Upon satisfaction of at least one of the conditions that the 720-degree difference Δ720 does not exceed the threshold value A1, that the 360-degree difference Δ360 does not exceed the threshold value B1, and that the 120-degree difference Δ120 does not exceed the threshold value C1, the CPU 24a identifies a current target cylinder of misfire detection as no misfired cylinder and terminates the vehicle stop-state engine misfire detection routine. Upon satisfaction of all the conditions that the 720-degree difference Δ720 exceeds the threshold value A1, that the 360-degree difference Δ360 exceeds the threshold value B1, and that the 120-degree difference Δ120 exceeds the threshold value C1, on the other hand, the CPU 24a identifies the current target cylinder of misfire detection as a misfired cylinder and outputs the occurrence of a single misfire (step S160) before terminating the vehicle stop-state engine misfire detection routine. In the six-cylinder engine, explosive combustion of the air-fuel mixture takes place at the crank angle CA of every 120 degrees as mentioned above. The 120-degree difference Δ120 between a large 30-degree rotation time T30 for a misfired cylinder and a small 30-degree rotation time T30 for a non-misfired cylinder is greater than the 120-degree difference Δ120 between 30-degree rotation times T30 for two non-misfired cylinders. A peak of the 120-degree difference Δ120 thus also substantially corresponds to a misfired cylinder. At the setting of the gearshift position SP to the P position where the damping control of the engine 22 is performed and no torque is output to the ring gear shaft 32a or the driveshaft, detection of an engine misfire is based on the 120-degree difference Δ120 in addition to the 720-degree difference Δ720 and the 360-degree difference Δ360 for the enhanced accuracy of engine misfire detection.

Figure 4:
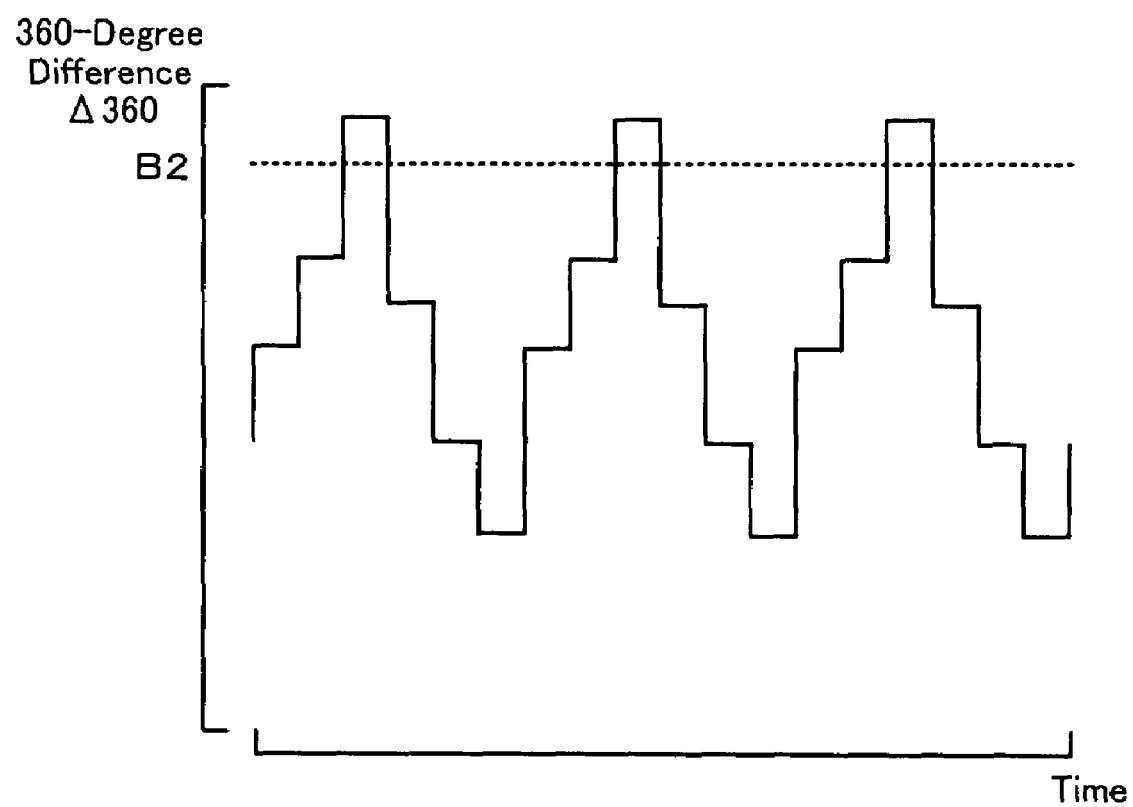
FIG. 4 is a chart showing a variation in 360-degree difference Δ360 in the single misfire state at an N position.

Upon identification of the neutral (N) position as the current setting of the gearshift position SP at step S130, the CPU 24a computes the 120-degree difference Δ120 of the 30-degree rotation time T30 (step S200) in the same manner as the computation of the 720-degree difference Δ720 of the 30-degree rotation time T30. The CPU 24a then sets threshold values A2, B2, and C2 for engine misfire detection corresponding to the N position (step S210). The threshold values A2, B2, and C2 are respectively greater than the threshold values A1, B1, and C1. The damping control is not performed at the setting of the gearshift position SP to the N position. The rotation of the crankshaft 26 at the N position accordingly has a relatively large variation even in the state of no occurrence of an engine misfire. Application of the same threshold values to the N position as those at the D position or the P position in the state of execution of the damping control may cause even a non-misfired cylinder to exceed the threshold values. This leads to wrong detection of an engine misfire. The engine misfire detection at the N position accordingly uses the greater threshold values than the threshold values used for the engine misfire detection at the D position or the P position. The threshold value A2 is empirically or otherwise determined to detect the occurrence of a misfire in the engine 22 when the 720-degree difference Δ720 exceeds the threshold value A2 in the state of no execution of the damping control of the engine 22 with the motors MG1 and MG2, that is, at the setting of the gearshift position SP to the N position. Similarly the threshold value B2 is empirically or otherwise determined to detect the occurrence of a misfire in the engine 22 when the 360-degree difference Δ360 exceeds the threshold value B2 in the state of no execution of the damping control of the engine 22 with the motors MG1 and MG2. The threshold value C2 is also empirically or otherwise determined to detect the occurrence of a misfire in the engine 22 when the 120-degree difference Δ120 exceeds the threshold value C2 in the state of no execution of the damping control of the engine 22 with the motors MG1 and MG2. After setting the threshold values A2, B2, and C2, the CPU 24a determines whether the 720-degree difference Δ720 exceeds the threshold value A2, whether the 360-degree difference Δ360 exceeds the threshold value B2, and whether the 120-degree difference Δ120 exceeds the threshold value C2 (step S220). Upon satisfaction of at least one of the conditions that the 720-degree difference Δ720 does not exceed the threshold value A2, that the 360-degree difference Δ360 does not exceed the threshold value B2, and that the 120-degree difference Δ120 does not exceed the threshold value C2, the CPU 24a identifies a current target cylinder of misfire detection as no misfired cylinder and terminates the vehicle stop-state engine misfire detection routine. Upon satisfaction of all the conditions that the 720-degree difference Δ720 exceeds the threshold value A2, that the 360-degree difference Δ360 exceeds the threshold value B2, and that the 120-degree difference Δ120-exceeds the threshold value C2, on the other hand, the CPU 24a identifies the current target cylinder of misfire detection as a misfired cylinder and outputs the occurrence of a single misfire (step S160) before terminating the vehicle stop-state engine misfire detection routine. FIG. 4 is a chart showing a variation in 360-degree difference Δ360 in the single misfire state at the N position as the current setting of the gearshift position SP. In the chart of FIG. 4, a cylinder having the 360-degree difference Δ360 exceeding the threshold value B2 is specified as a misfired cylinder. At the setting of the gearshift position SP to the N position where the damping control of the engine 22 is not performed, detection of an engine misfire is based on the 720-degree difference Δ720, the 360-degree difference Δ360, and the 120-degree difference Δ120 with setting of the greater threshold values than those at the D position or the P position.

As described above, at the setting of the gearshift position SP to either the D position or the P position where the damping control is performed with the motors MG1 and MG2 to reduce the vibration of the crankshaft 26 of the engine 22, the hybrid vehicle 20 of the embodiment sets the threshold values A1, B1, and C1 for engine misfire detection and detects an engine misfire based on the relations between the 30-degree rotation times T30 computed from the rotational positions of the crankshaft 26 and the threshold values A1, B1, and C1. At the setting of the gearshift position SP to the N position where the damping control is not performed, the hybrid vehicle 20 of the embodiment sets the greater threshold values A2, B2, and C2 for engine misfire detection than the threshold values A1, B1, and C1 and detects an engine misfire based on the relations between the 30-degree rotation times T30 and the threshold values A2, B2, and C2. Namely this embodiment changes over the threshold values used for engine misfire detection according to the execution or non-execution of the damping control. This arrangement enables engine misfire detection by the simple series of processing, compared with the conventional procedure of changing the engine misfire detection method according to the execution or non-execution of the damping control. The execution or non-execution of the damping control is readily identifiable based on the setting of the gearshift position SP. The threshold values A2, B2, and C2 set in the state without execution of the damping control are greater than the threshold values A1, B1, and C1 set in the state with execution of the damping control. This arrangement desirably enables detection of a misfire in the engine 22 with high accuracy.

At the selection of the D position as the gearshift position SP, the engine misfire detection requires only the two values, the 720-degree difference Δ720 and the 360-degree difference Δ360 (omission of the 120-degree difference Δ120), to ensure the sufficient accuracy of detection. At the selection of either the P position or the N position as the gearshift position SP, on the other hand, the engine misfire detection requires all the three values, the 720-degree difference Δ720, the 360-degree difference Δ360, and the 120-degree difference Δ120, to ensure the sufficient accuracy of detection. Changing the number of these angle differences adopted for engine misfire detection according to the setting of the gearshift position SP desirably satisfies the conflicting requirements, the enhanced accuracy of engine misfire detection and the simple processing of engine misfire detection.

The embodiment discussed above is to be considered in all aspects as illustrative and not restrictive. There may be many modifications, changes, and alterations without departing from the scope or spirit of the main characteristics of the present invention.

The procedure of the embodiment sets the threshold values for engine misfire detection according to the setting of the gearshift position SP to the D position, the P position, or the N position. One modified procedure may set the threshold values for engine misfire detection according to the execution or non-execution of the damping control of the engine 22. This modified procedure also enables engine misfire detection by the simple series of processing, compared with the conventional procedure of changing the engine misfire detection method according to the execution or non-execution of the damping control.

In the structure of the embodiment, both the motors MG1 and MG2 are used for the damping control of the engine 22. Only one of the motors MG1 and MG2 may alternatively be used for the damping control of the engine 22.

The engine misfire detection of the embodiment uses the 720-degree difference Δ720 and the 360-degree difference Δ360 computed from the 30-degree rotation times T30 and the corresponding threshold values A1 and B1 at the setting of the gearshift position SP to the D position. The engine misfire detection uses the 720-degree difference Δ720, the 360-degree difference Δ360, and the 120-degree difference Δ120 and the corresponding threshold values A1, B1, and C1 at the setting of the gearshift position SP to the P position. The engine misfire detection uses the 720-degree difference Δ720, the 360-degree difference Δ360, and the 120-degree difference Δ120 and the corresponding threshold values A2, B2, and C2 at the setting of the gearshift position SP to the N position. These are, however, not essential, but any arbitrary number of angle differences and corresponding threshold values may be used for engine misfire detection at each setting of the gearshift position SP. The engine misfire detection may use any angle difference between the currently input 30-degree rotation time T30 and a previous 30-degree rotation time T30 input any angles before or may alternatively use the 30-degree rotation time T30 itself. The rotation speed of the crankshaft 26 may be used as a parameter of the 30-degree rotation time T30.

The procedure of the embodiment sets the identical threshold values A1 and B1 for engine misfire detection at the D position and for engine misfire detection at the P position as the gearshift position SP. Different threshold values may be set for engine misfire detection at the P position from those for engine misfire detection at the D position.

The above embodiment regards detection of a single engine misfire. The technique of the invention is also applicable to detection of consecutive misfires with two consecutive misfired cylinders among the multiple cylinders of the engine 22 or to detection of intermittent misfires with two misfired cylinders located across one fired cylinder among the multiple cylinders of the engine 22.

The above embodiment regards the engine misfire detection during stop of the hybrid vehicle 20. The technique of the invention is also applicable to engine misfire detection during drive of the hybrid vehicle 20 except the processing flow executed at the setting of the gearshift position to the P position.

The above embodiment regards the hybrid vehicle 20 equipped with the six-cylinder engine 22. The technique of the invention is also applicable to hybrid vehicles equipped with engines having various numbers of cylinders, for example, a hybrid vehicle equipped with a four-cylinder engine and a hybrid vehicle equipped with an eight-cylinder engine. Threshold values of engine misfire detection suitable for each engine type of the hybrid vehicle are empirically determined according to the execution or non-execution of the damping control of the engine 22.

Figure 5:
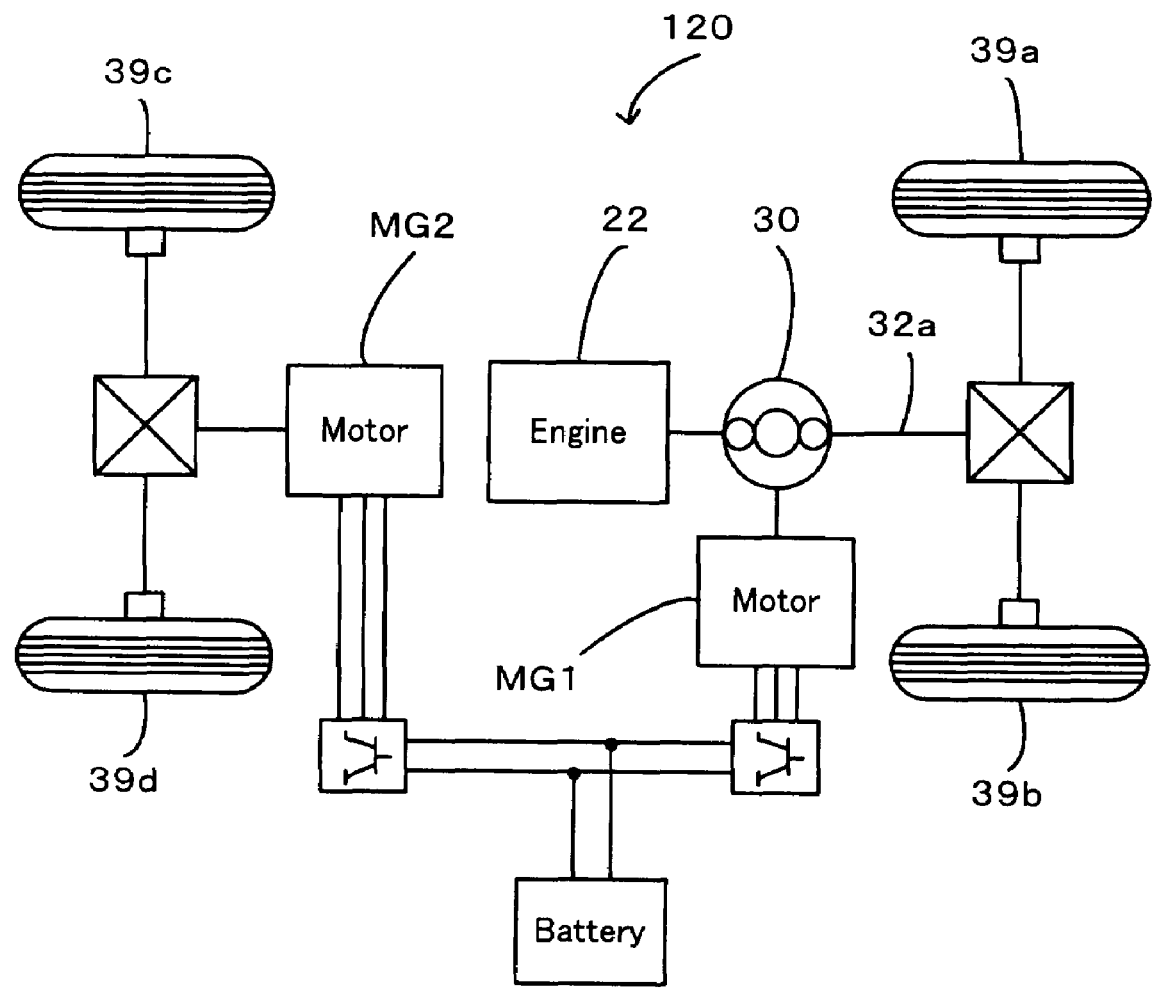
FIG. 5 schematically illustrates the configuration of another hybrid vehicle 120 in one modified example.
Figure 6:
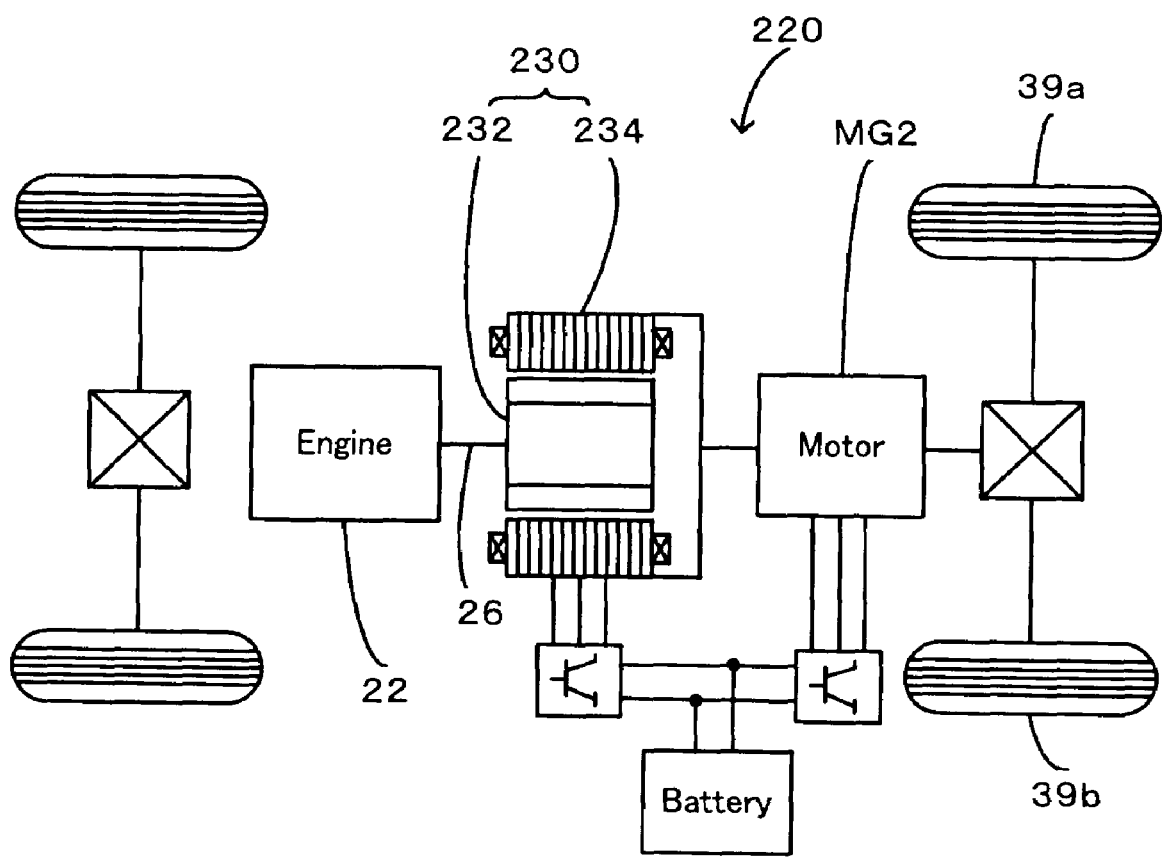
FIG. 6 schematically illustrates the configuration of still another hybrid vehicle 220 in another modified example.

The above embodiment regards the engine misfire detection apparatus mounted on the hybrid vehicle 20 equipped with the engine 22, the power distribution integration mechanism 30 linked with the crankshaft 26 of the engine 22, with the rotating shaft of the motor MG1, and with the ring gear shaft 32*a* or the driveshaft, and the motor MG2 connected to the ring gear shaft 32*a* via the reduction gear 35. The engine misfire detection apparatus of the invention may be mounted on a hybrid vehicle 120 of one modified structure shown in FIG. 5, where the power of the motor MG2 is output to another axle (axle connected with wheels 64*a* and 64*b* in FIG. 5) that is different from the axle linked to the ring gear shaft 32*a* (axle connected with the drive wheels 63*a* and 63*b*). The engine misfire detection apparatus of the invention may also be mounted on a hybrid vehicle 220 of another modified structure shown in FIG. 6, which is equipped with a pair-rotor motor 230. The pair-rotor motor 230 includes an inner rotor 232 connected to the crankshaft 26 of the engine 22 and an outer rotor 234 connected to a driveshaft that outputs power to the drive wheels 63*a* and 63*b*. The pair-rotor motor 230 transmits part of the output power of the engine 22 to the driveshaft, while converting the residual engine output power into electric power.

The above embodiment regards the series parallel hybrid vehicle 20. The technique of the invention is not restricted to the hybrid vehicles of this arrangement but is applicable to hybrid vehicles of any other arrangements that execute damping control with a motor to reduce the vibration of a crankshaft 26 of an engine. For example, the invention may be adopted in series hybrid vehicle as well as in parallel hybrid vehicles. In application to the parallel hybrid vehicles, the motor of the invention may also be used as the generator of the invention.

The engine misfire detection apparatus is used for misfire detection of the engine 22 mounted on the hybrid vehicle 20 in the above embodiment. The hybrid vehicle is, however, not essential. The engine misfire detection apparatus may be used for misfire detection of an engine mounted on any of various moving bodies including trains, aircraft, boats and ships as well as automobiles and for misfire detection of an engine incorporated in any of stationary equipment including construction machines. The technique of the invention may be actualized by an engine misfire detection method, as well as the engine misfire detection apparatus.

The present application claims priority from Japanese Patent Application No. 2006-38376 filed on Feb. 15, 2006, the contents of which are all hereby incorporated by reference into this application.

INDUSTRIAL APPLICABILITY

The technique of the invention is preferably applied to the automobile-related industries including cars, buses, and trucks, as well as to the transport vehicle-related industries including trains, boats and ships, and aircraft.

The invention claimed is:

1. An engine misfire detection apparatus for detection of a misfire in an internal combustion engine included in a power output apparatus, where the power output apparatus includes the internal combustion engine, a power generation unit that is connected with an output shaft of the internal combustion engine and utilizes at least part of output power from the internal combustion engine to generate electric power, and a motor that is capable of outputting power to a driveshaft, the engine misfire detection apparatus comprising:
    a rotational position detection unit that detects a rotational position of the output shaft of the internal combustion engine;
    a unit angle rotation time computation module that computes a unit angle rotation time, which is required for rotation of every preset unit rotational angle of the output shaft of the internal combustion engine, from the detected rotational position;
    a damping control execution module that performs damping control upon satisfaction of a predetermined condition, where the damping control drives at least one of the power generation unit and the motor to reduce vibration of the internal combustion engine caused by operation of the internal combustion engine; and
    an engine misfire detection module that detects an engine misfire based on the computed unit angle rotation time and a preset first threshold value during execution of the damping control by the damping control execution module, while detecting an engine misfire based on the computed unit angle rotation time and a preset second threshold value that is different from the first threshold value during non-execution of the damping control by the damping control execution module,
    wherein the engine misfire detection module detects a misfire of the internal combustion engine in response to a predetermined angle difference of the computed unit angle rotation time exceeding the preset first threshold value during execution of the damping control by the damping control execution module, and
    the engine misfire detection module detects a misfire of the internal combustion engine in response to the predetermined angle difference of the computed unit angle rotation time exceeding the preset second threshold value during non-execution of the damping control by the damping control execution module.

2. The engine misfire detection apparatus in accordance with claim 1, wherein the damping control execution module determines satisfaction of the predetermined condition in response to selection of either a parking position or a drive position as a gearshift position to perform the damping control, and
    the damping control execution module determines dissatisfaction of the predetermined condition in response to selection of a neutral position as the gearshift position not to perform the damping control.

3. The engine misfire detection apparatus in accordance with claim 1, wherein the engine misfire detection module detects an engine misfire when a rotation speed of the driveshaft is equal to 0.

4. The engine misfire detection apparatus in accordance with claim 1, wherein the engine misfire detection module uses the second threshold value, which is greater than the first threshold value, for detection of an engine misfire during non-execution of the damping control by the damping control execution module.

5. The engine misfire detection apparatus in accordance with claim 1, wherein the engine misfire detection module uses at least one of a 720-degree difference, a 360-degree difference, and a 120-degree difference of the computed unit angle rotation time as the predetermined angle difference for detection of an engine misfire.

6. A hybrid vehicle equipped with a power output apparatus and the engine misfire detection apparatus for detection of a misfire in the internal combustion engine in accordance with claim 1,
    wherein the power output apparatus includes the internal combustion engine, the power generation unit that is connected with the output shaft of the internal combustion engine and that utilizes at least part of output power from the internal combustion engine to generate electric power, and the motor that is capable of outputting power to the driveshaft.

7. An engine misfire detection method for detection of a misfire in an internal combustion engine included in a power output apparatus, where the power output apparatus includes the internal combustion engine, a power generation unit that is connected with an output shaft of the internal combustion engine and utilizes at least part of output power from the internal combustion engine to generate electric power, and a motor that is capable of outputting power to a driveshaft, the engine misfire detection method comprising:
    detecting a rotational position of the output shaft of the internal combustion engine;
    computing a unit angle rotation time, which is required for rotation of every preset unit rotational angle of the output shaft of the internal combustion engine, from the detected rotational position; and
    detecting an engine misfire based on the computed unit angle rotation time and a preset first threshold value during execution of damping control, which is performed upon satisfaction of a predetermined condition and drives at least one of the power generation unit and the motor to reduce vibration of the internal combustion engine caused by operation of the internal combustion engine, while detecting an engine misfire based on the computed unit angle rotation time and a preset second threshold value that is different from the preset first threshold value during non-execution of the damping control, wherein the detecting the engine misfire is performed in response to a predetermined angle difference of the computed unit angle rotation time exceeding the preset first threshold value during execution of the damping control, and the detecting the engine misfire is performed in response to the predetermined angle difference of the computed unit angle rotation time exceeding the preset second threshold value during non-execution of the damning control.

* * * * *